(12) United States Patent
Baird

(10) Patent No.: US 10,682,593 B2
(45) Date of Patent: Jun. 16, 2020

(54) WATER FILTER CARTRIDGE WITH SLANTED NOZZLES

(71) Applicant: Michael T. Baird, Temecula, CA (US)

(72) Inventor: Michael T. Baird, Temecula, CA (US)

(*) Notice: Subject to any disclaimer, the term of this patent is extended or adjusted under 35 U.S.C. 154(b) by 1040 days.

(21) Appl. No.: 14/970,310

(22) Filed: Dec. 15, 2015

(65) Prior Publication Data

US 2016/0175743 A1   Jun. 23, 2016

Related U.S. Application Data

(60) Provisional application No. 62/095,564, filed on Dec. 22, 2015.

(51) Int. Cl.
| | |
|---|---|
| *B01D 27/08* | (2006.01) |
| *B01D 35/30* | (2006.01) |
| *B01D 35/153* | (2006.01) |
| *B01D 35/14* | (2006.01) |
| *B01D 35/147* | (2006.01) |
| *C02F 1/00* | (2006.01) |

(52) U.S. Cl.
CPC .......... *B01D 27/08* (2013.01); *B01D 35/14* (2013.01); *B01D 35/153* (2013.01); *B01D 35/30* (2013.01); *B01D 35/147* (2013.01); *B01D 35/306* (2013.01); *B01D 2201/29* (2013.01); *B01D 2201/291* (2013.01); *B01D 2201/303* (2013.01); *B01D 2201/4007* (2013.01); *B01D 2201/4046* (2013.01); *B01D 2201/4053* (2013.01); *B01D 2201/4061* (2013.01); *C02F 1/001* (2013.01); *C02F 2201/004* (2013.01); *C02F 2201/006* (2013.01); *F25D 2323/121* (2013.01)

(58) Field of Classification Search
CPC ................... B01D 27/08; B01D 35/30; B01D 2201/4053; B01D 35/147; B01D 2201/4061; B01D 2201/4046; B01D 35/306; B01D 35/153; B01D 35/14; B01D 2201/4007; B01D 2201/303; B01D 2201/291; B01D 2201/29; C02F 2201/006; C02F 2201/004; C02F 1/001; F25D 2323/121
See application file for complete search history.

(56) References Cited

U.S. PATENT DOCUMENTS

| | | |
|---|---|---|
| 5,186,829 A | 2/1993 | Janik |
| 5,207,898 A | 5/1993 | Hodgkins |
| 5,620,599 A | 4/1997 | Hopkins et al. |

(Continued)

FOREIGN PATENT DOCUMENTS

| | | |
|---|---|---|
| AU | 199939201 B1 | 2/2000 |
| EP | 0917900 A1 | 5/1999 |

(Continued)

*Primary Examiner* — Lucas A Stelling
*Assistant Examiner* — Angel Olivera
(74) *Attorney, Agent, or Firm* — Stetina Brunda Garred and Brucker

(57) ABSTRACT

A water filter cartridge has an end cap with inlet and outlet nozzles extending from the end cap. A lateral support extends laterally from at least one of the nozzles. A projection extends from the lateral support toward a receiving manifold to cooperate with the manifold during use. The lateral support is offset from the end cap so the projection is vertically offset from an end of the cartridge and laterally offset from and supported from the nozzles.

22 Claims, 8 Drawing Sheets

(56) References Cited

U.S. PATENT DOCUMENTS

| | | | |
|---|---|---|---|
| 6,458,269 B1* | 10/2002 | Bassett | B01D 27/08 210/119 |
| 7,000,894 B2 | 2/2006 | Olson et al. | |
| 7,610,932 B2 | 11/2009 | Olson et al. | |
| 2003/0019805 A1 | 1/2003 | Fritze | |
| 2004/0211931 A1* | 10/2004 | Olson | B01D 35/147 251/149.9 |

FOREIGN PATENT DOCUMENTS

| | | |
|---|---|---|
| JP | H06327909 A | 11/1994 |
| SU | 1430062 A1 | 11/1986 |

* cited by examiner

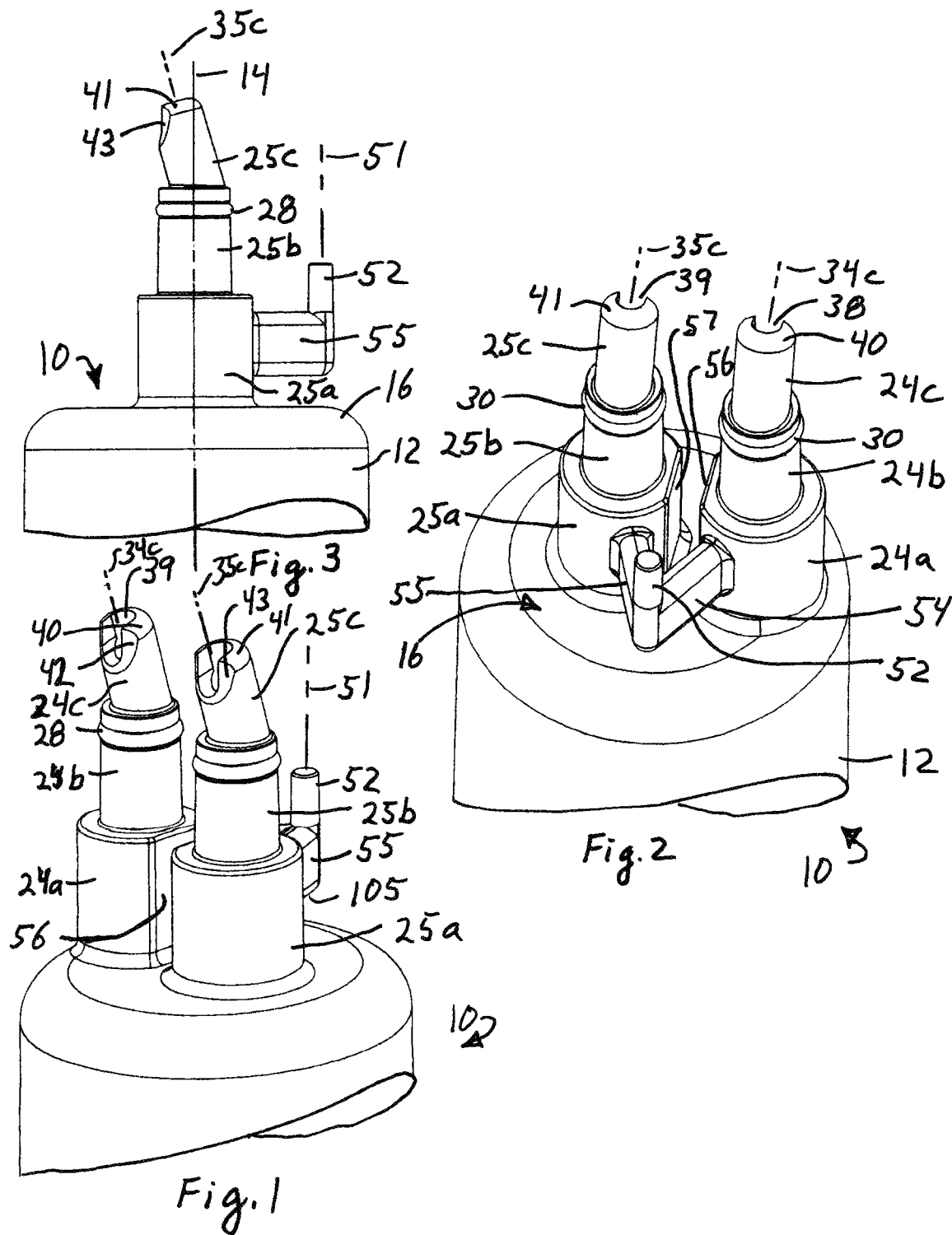

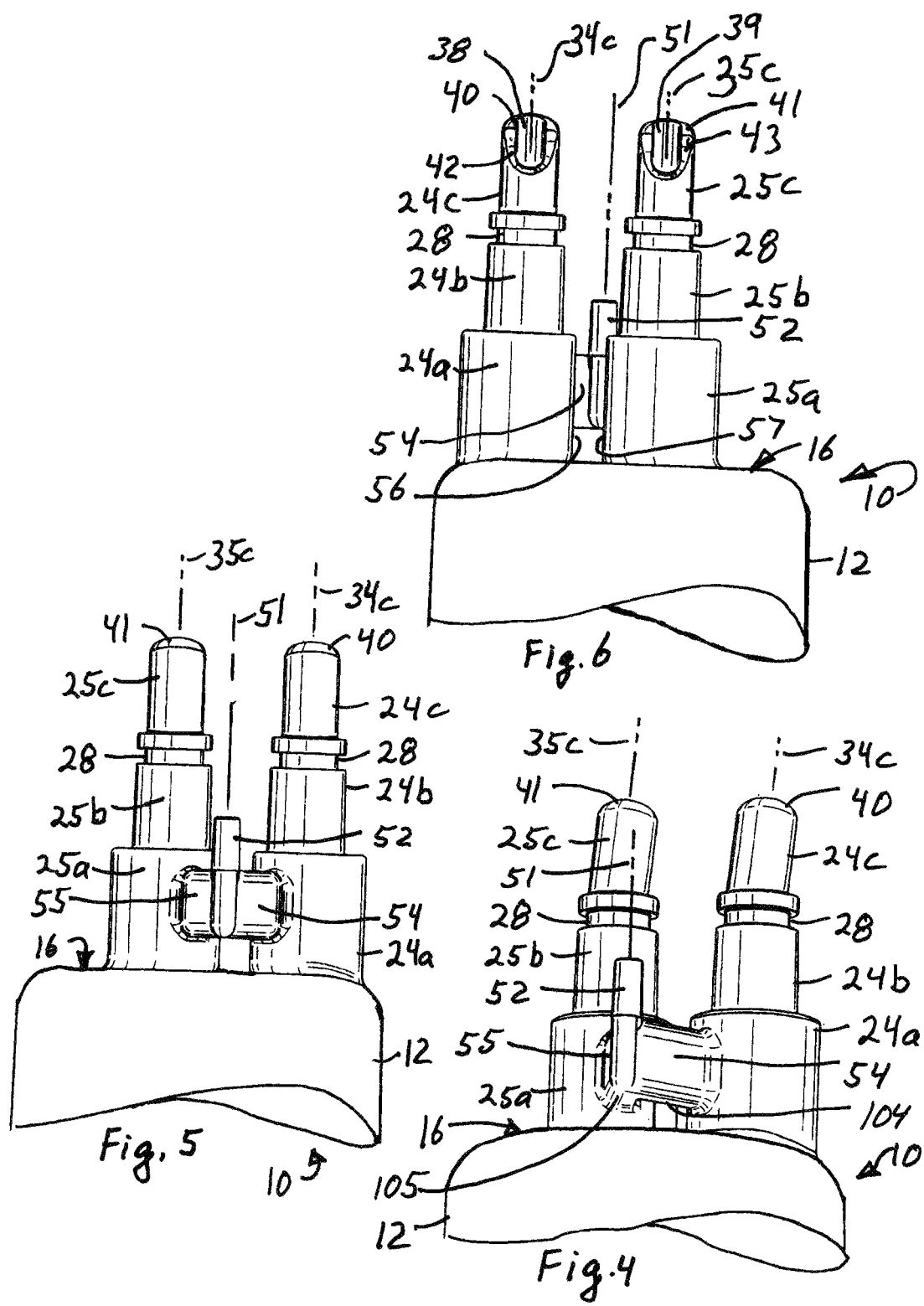

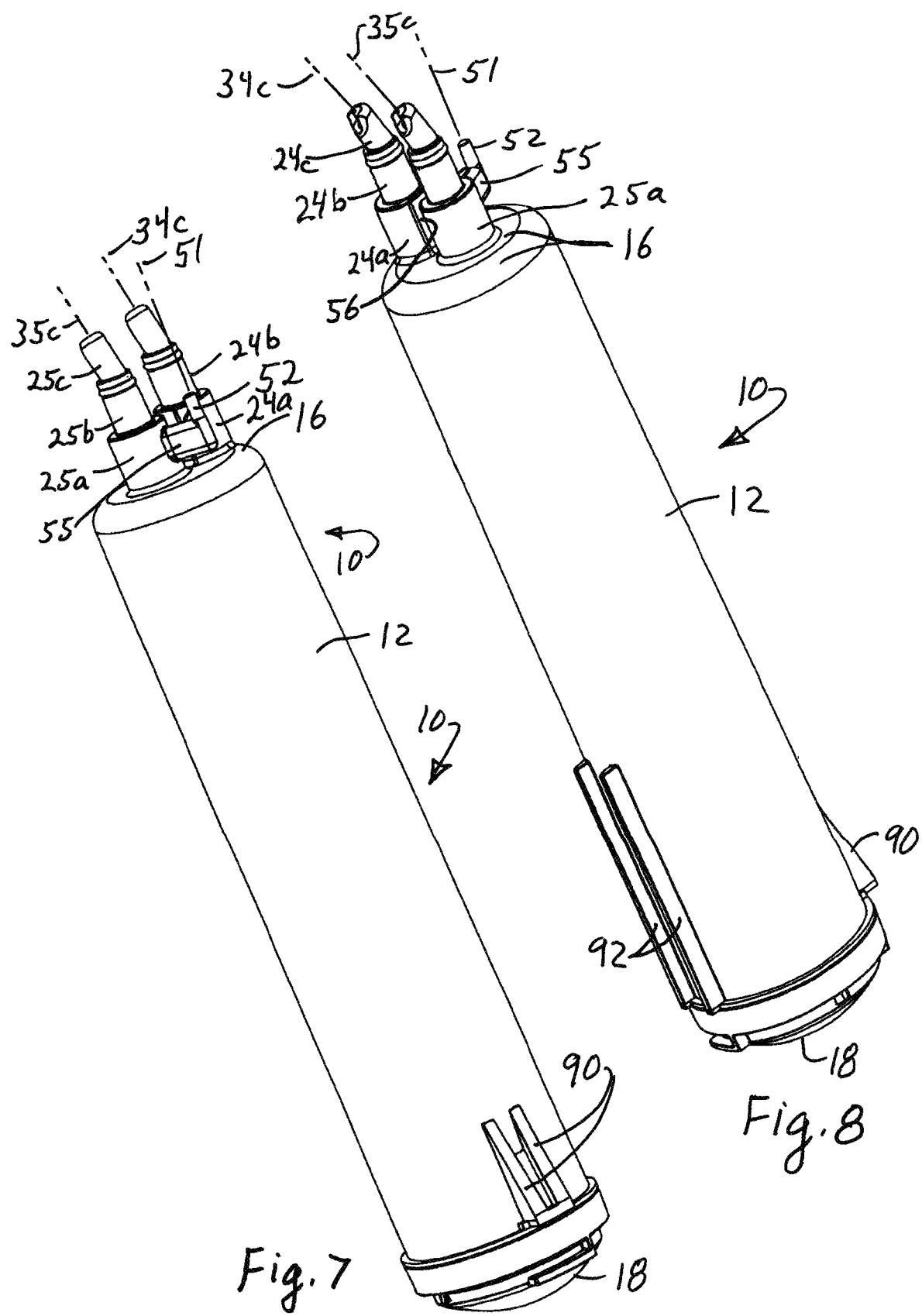

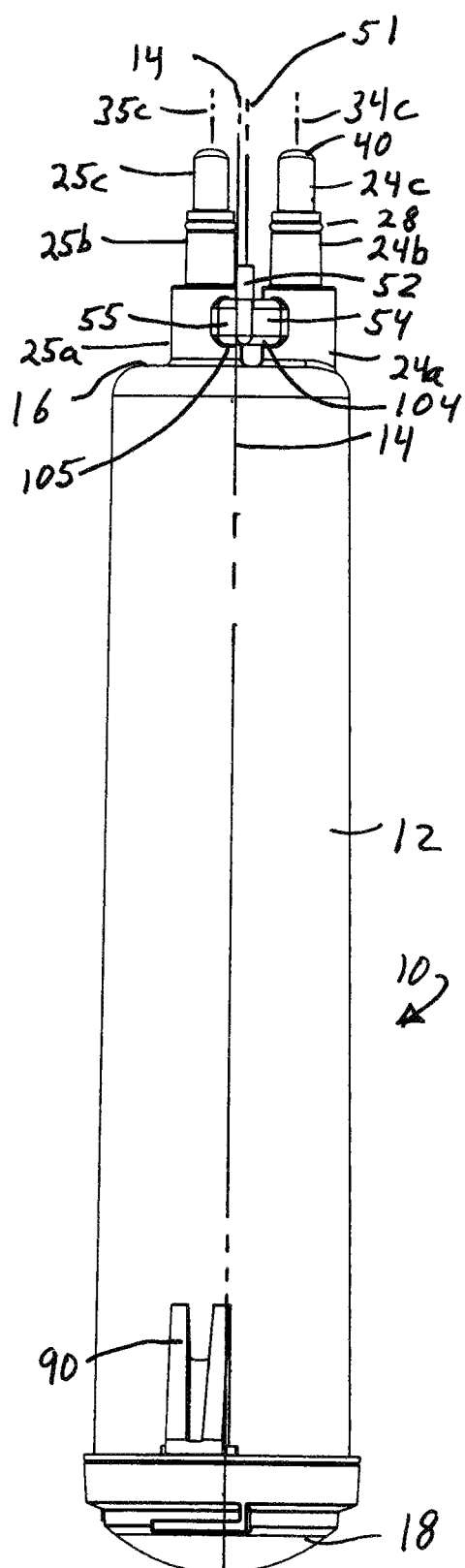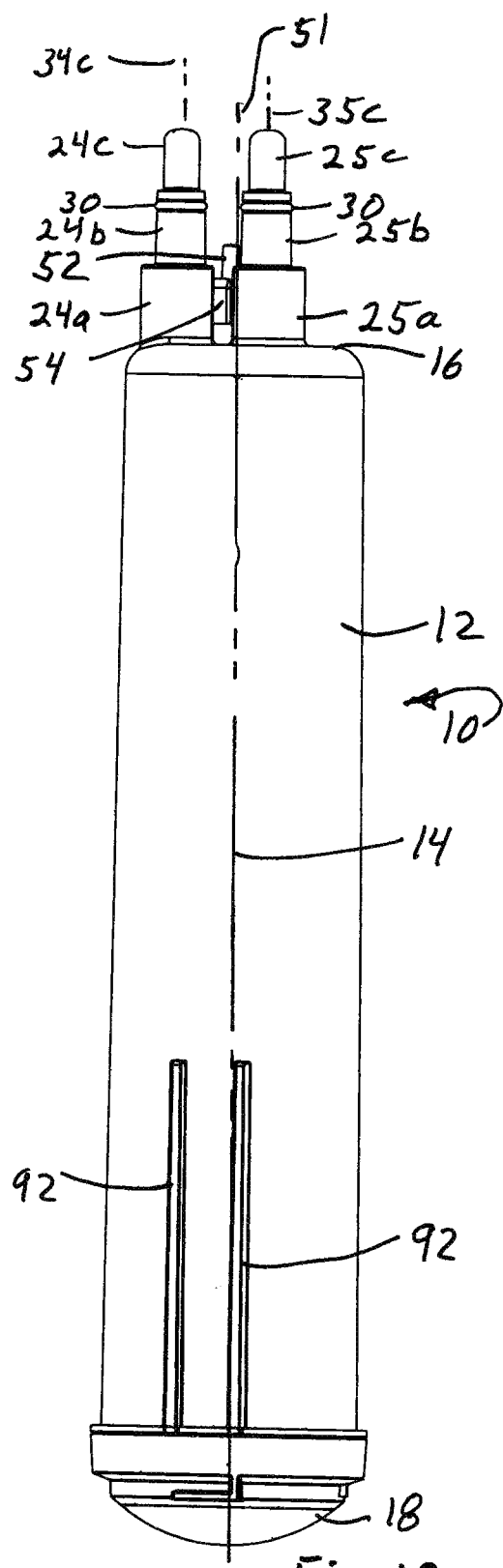

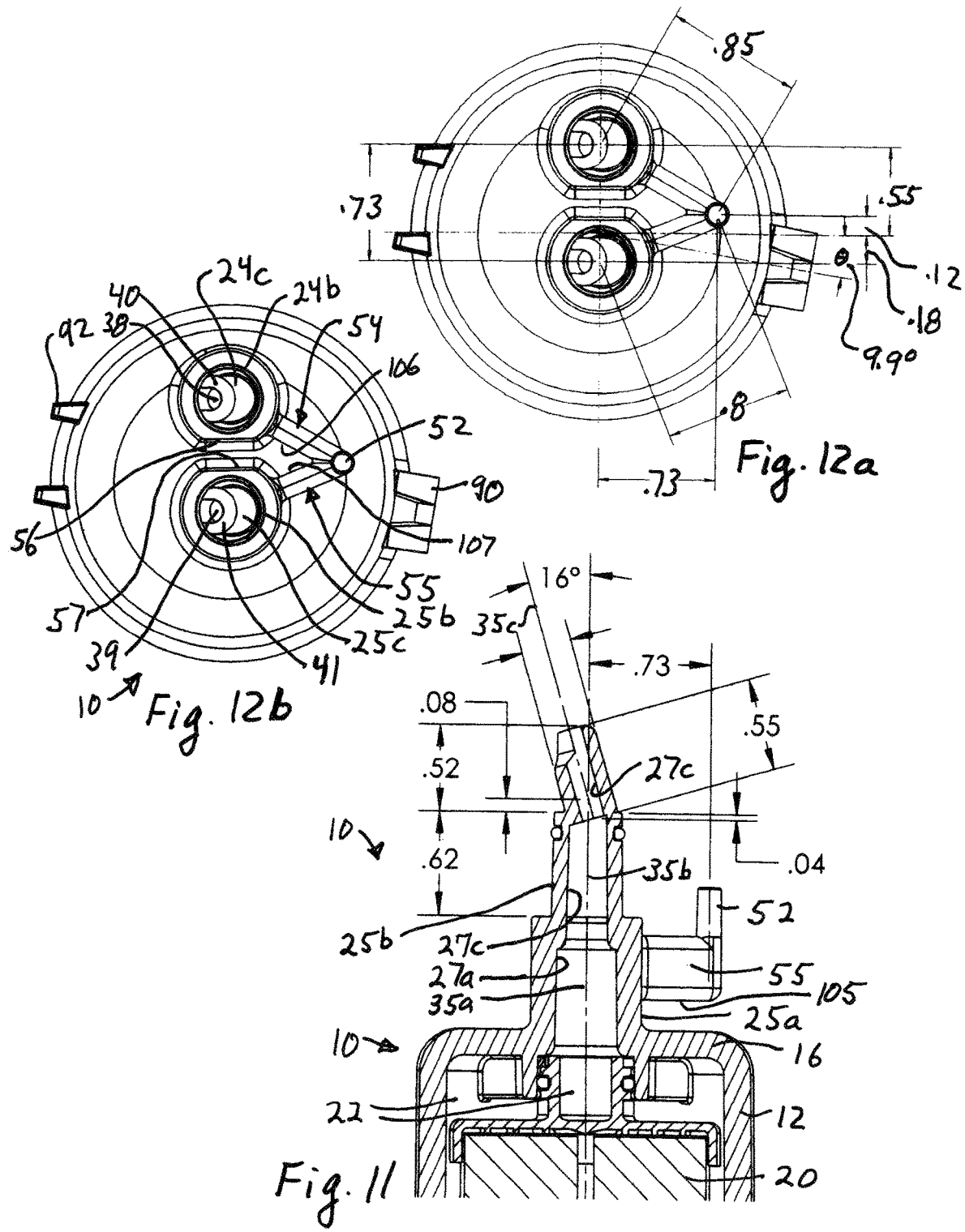

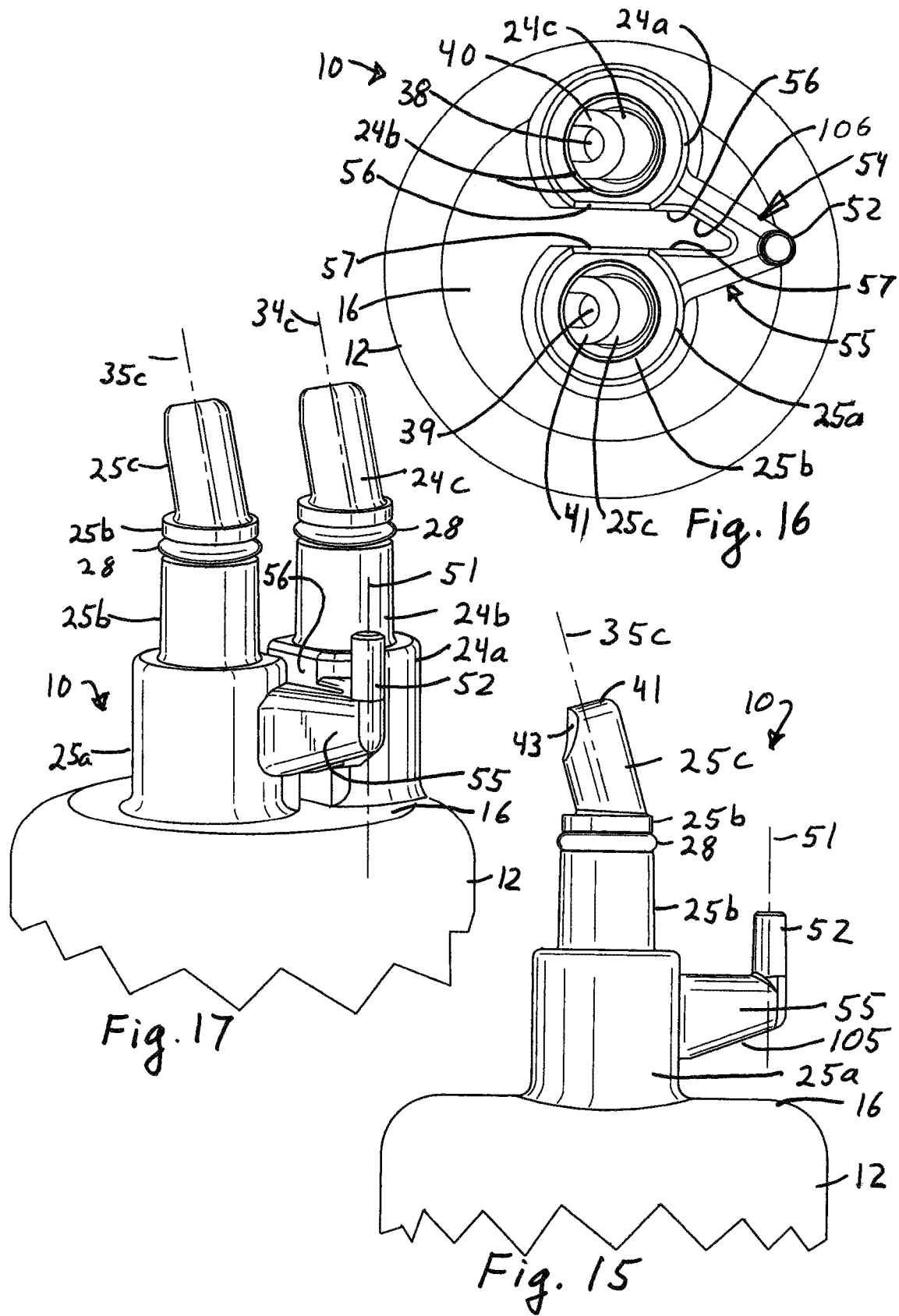

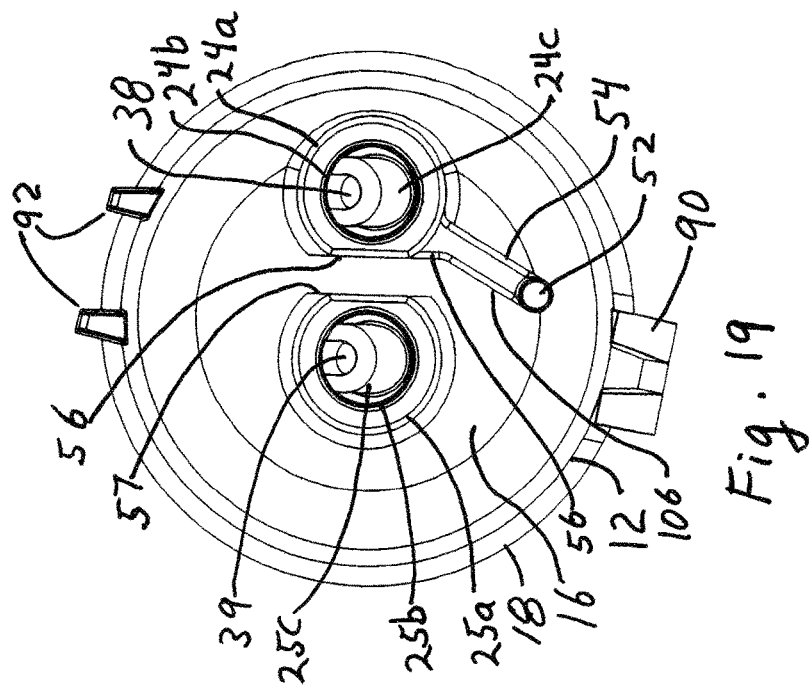
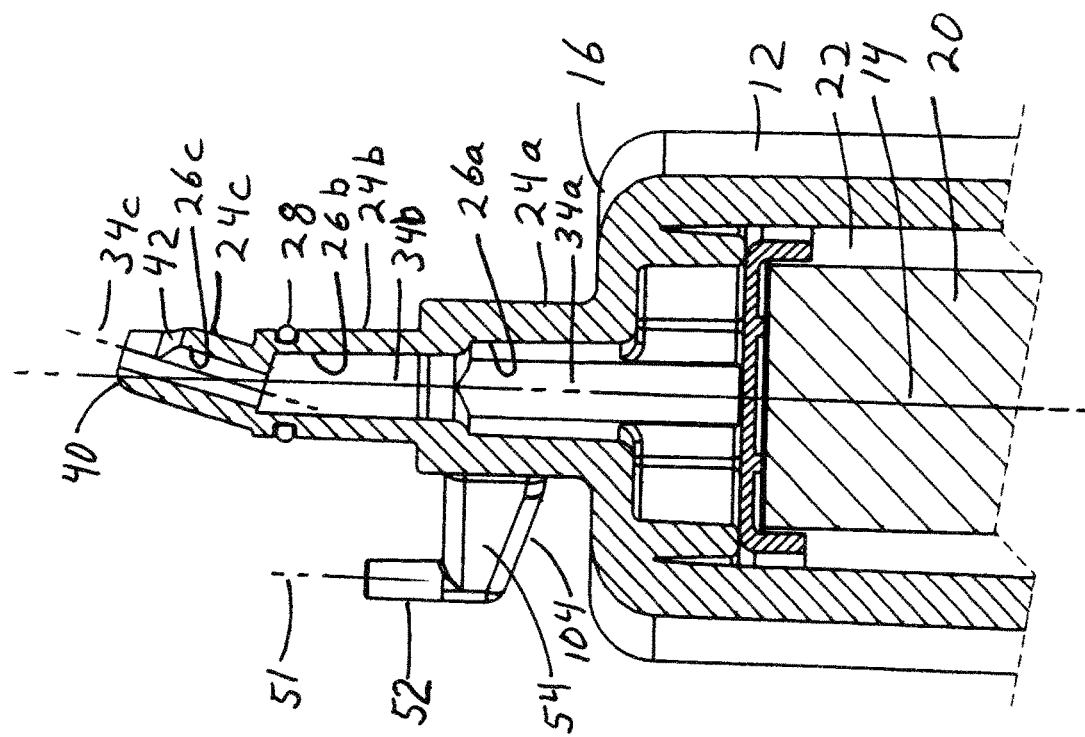
Fig. 19
Fig. 18

WATER FILTER CARTRIDGE WITH SLANTED NOZZLES

CROSS-REFERENCE TO RELATED APPLICATIONS

The application claims the benefit under 35 U.S.C. § 119(e) to Provisional Patent Application No. 62/095,564 filed Dec. 22, 2015, the entire contents of which are incorporated herein by reference.

STATEMENT RE: FEDERALLY SPONSORED RESEARCH/DEVELOPMENT

Not Applicable

BACKGROUND

The present invention relates to the purification of drinking water, and more particularly, to replaceable filter cartridges used in household water filtration systems.

Many appliances and refrigerators are equipped with door-mounted drinking water and ice dispensers. Some appliances and refrigerators incorporate their own dedicated water filtration system, such as those disclosed in U.S. Pat. No. 7,000,894 to Olson, et. al. Those dedicated filtration systems employ a removable filter cartridge which is typically replaced every several months. Those filters use a projection that extends from the nozzle-end of the filter cartridge to actuate a bypass valve in a head assembly or manifold mounted in the appliance. The manifold is configured to receive the nozzles and projection described in that patent. The replacement cost of these filters from the manufacturer of the appliance is high as the appliance manufacturer attempts to configure the filter cartridges in ways that enable the manufacturer to make it difficult for others to make the cartridge, thus creating a captive market for which the original manufacturer is the sole supplier and for which the manufacturer can charge a premium price. There is thus a need for a filter cartridge that can replace such filter cartridges as they wear out, but that is available at a lower cost.

Projections extending from the ends of filter cartridges are used for numerous purposes. These purposes include aligning the filter cartridge in the manifold, stabilizing the cartridge in the manifold, or actuating shut-off-valves that allow water to flow only when the filter cartridge is present and shut off flow when the cartridge is removed. The location and shape of such projections may vary. But if the projections must extend any large distance into the manifold then the long projections are subject to damage during shipping, handling, installation and removal of the filter cartridge. Moreover, the longer the projection the more prone it is to being displaced so it may not readily mate with the corresponding recess in the manifold. There is thus a need for a filter cartridge with a shorter projection that may nonetheless reach locations within the manifold.

The inlet and outlet nozzles must extend into the manifold to mate with corresponding fittings in the manifold and the nozzle length can become long enough to subject the nozzles to potential damage or deflection during shipping, handling or installation of the filter cartridge. When the inlet and outlet nozzles are separated as in U.S. Pat. No. 7,000,894 to Olson, the nozzles must have thick walls to provide the needed strength and stability. There is a need for a way to strengthen and stabilize the nozzles.

For some applications, like those in U.S. Pat. Nos. 7,610,932 and 7,000,894 to Olson, the relative location of the nozzles and a projection are important. When the nozzles or projection become long, the relative position of the ends of the nozzles and the projection are more subject to variation and those ends must mate readily with the corresponding recesses in the manifold. There is thus a need for a filter cartridge that stabilizes the relative positions of the nozzles and any actuating projection.

These water filters are held in the manifold by bayonet lugs on the cartridge neck, or by cams or mounting assemblies on the elongated body of the filter cartridge. Examples of such mounting assemblies on the filter cartridge are found in U.S. Pat. Nos. 7,147,773 and 8,627,675.

One difficulty with the above filter cartridges is that occasionally the water in the manifold becomes cold enough to freeze and then the filter cartridge is difficult to extract from the manifold and from the retaining mechanism. U.S. Pat. No. 8,627,675 uses a lever insertion and removal mechanism and the mechanical advantage offered by the lever helps remove filter cartridges where the inlet or outlet has frozen. But even with the removal achieved users typically want to quickly clear the ice from the inlet or outlet and immediately reinsert the filter cartridge for use and the current nozzle and manifold designs make that difficult. There is thus a need for an improved filter cartridge that makes it easier to clear ice from frozen inlet or outlet nozzles in the cartridge, and that facilitates clearing ice from the manifold inlet and outlet receptacles.

BRIEF SUMMARY

A water filter cartridge is provided having an end cap with inlet and outlet nozzles extending from an end piece wall of the end cap. A lateral support extends laterally from at least one of the nozzles. A projection extends from the lateral support toward a receiving manifold to cooperate with the manifold during use—primarily to actuate a bypass valve in the manifold. The lateral support is offset from the end cap as is the projection. The lateral support advantageously has a top and bottom edge with the bottom edge being inclined to a plane orthogonal to a longitudinal axis of the filter cartridge so that the bottom edge of the lateral support adjacent the projection is further from the end piece wall than the bottom edge at the nozzle from which the lateral support extends.

In more details, there is advantageously provided a water filer cartridge having a first end, a closed second end, and a cartridge longitudinal axis extending through the ends. The cartridge has a filter media contained within the housing between the first and second ends. The, the cartridge includes an end piece wall on the first end of the cartridge where the end piece wall has an outer periphery. The end piece wall includes an inlet tube extending from the end piece wall. The inlet tube has a distal end spaced apart from the end piece wall. The inlet tube encloses an inlet flow passage in fluid communication with an inlet of the filter media. An outlet tube also extends from the end piece wall and the outlet tube also has a distal end spaced apart from the end piece wall with the outlet tube enclosing an outlet flow passage in fluid communication with an outlet of the filter media. At least one lateral support extends laterally from one of the inlet or outlet tubes. The lateral support is spaced apart from the end piece wall. A projection extends from the lateral support along a longitudinal projection axis and in a direction away from the end piece wall.

In further variations, the water filter cartridge has two lateral supports each extending from a different one of the inlet and outlet tubes. The two lateral supports may join each other and extend a distance less than that needed to extend beyond an outer periphery of the filter cartridge so that the projection extends from a location within that outer periphery. Advantageously, the two lateral supports join each other to form a V-shaped support and the projection extends from an apex of the V-shaped projection.

In still further variations, the tubes each comprise a stepped tube with at least one reduced diameter portion and including a base portion having a base longitudinal axis. At least one of the tubes has a distal end portion having a distal longitudinal axis that is inclined in a direction away from the longitudinal axis of a base portion of that tube, which base portion longitudinal axis is substantially parallel to the cartridge longitudinal axis. One or both of the tubes also advantageously has a distal end portion having a distal longitudinal axis that is inclined in a direction away from a longitudinal axis of a base portion of that tube, where the base portion longitudinal axis is substantially parallel to the cartridge longitudinal axis. Further, the fluid passageway extending along that inclined longitudinal axis is conical in shape and increasing in diameter in a direction away from the tube with the inclined axis.

Moreover, the projection may be positioned between a base of the inlet tube and a base of the outlet tube when viewed from a side of the tubes opposite the projection, with each base having a longitudinal axis. The distance from the longitudinal axis of the base of the inlet tube to the longitudinal axis of the base of the outlet tube is less than the distance from the longitudinal axis of the base of the inlet tube to the longitudinal axis of the projection. The distance from the longitudinal axis of the base of the inlet tube to the longitudinal axis of the projection is greater than the distance from the longitudinal axis of the base of the outlet tube to the longitudinal axis of the projection. The distance from the longitudinal axis of the base of the inlet tube to the longitudinal axis of the base of the outlet tube is about 2 cm, and wherein the distance from the longitudinal axis of the base of the inlet tube to the longitudinal axis of the projection is about 2 cm, and the distance from the longitudinal axis of the base of the outlet tube to the longitudinal axis of the projection is about 2 cm.

In still further variations, each of the inlet and outlet nozzles has a base portion extending along an axis generally parallel to the cartridge longitudinal axis, and wherein at least one of the base portions has a circular outer periphery with a flat portion on a side of the at least one base portion which flat portion is facing the other base portion. The projection may be positioned between a base of the inlet tube and a base of the outlet tube when viewed from a side of the tubes opposite the projection and may be viewed between the two flats when each base has a flat. Advantageously at least one of the base portions has a height H measured from an exterior surface of the end piece wall along the cartridge longitudinal axis, and the projection has a distal end located a distance greater than H from the exterior surface of the end piece wall measured along the longitudinal axis. Moreover, each lateral support has a top surface located less than a distance H from the exterior surface of the end piece wall measured along the longitudinal axis.

Preferably, each tube has a base portion extending from the end piece wall, an intermediate portion and a distal end portion with a first, inwardly extending shoulder between the base portion and the intermediate portion. A second, inwardly extending shoulder is located between the intermediate portion and the distal end portion. The projection has a distal end that is located between the first and second shoulders.

Advantageously, at least one and preferably both tubes extend from the end piece wall along a tube longitudinal axis, with the tube having a distal end extending along an axis inclined at an angle of 1-30° from that tube longitudinal axis. The preferred angle is about 16 degrees. Moreover, at least one lateral support preferably has a bottom edge that is inclined away from a plane orthogonal to the cartridge longitudinal axis at an angle of about 10-25 degrees so that the bottom edge of the lateral support is further from the end piece wall adjacent the longitudinal projection axis than adjacent the tube from which the at least one lateral support extends when measured in a plane orthogonal to the cartridge longitudinal axis. An angle of about 20 degrees is preferred for the bottom edge of the lateral supports, and a top edge is advantageously flat or inclined slightly toward the bottom edge at an angle of about 1-5 degrees.

There is also provided a water filer cartridge having an end piece wall with first and second fitting extending from that end piece wall, each fitting having a fluid passage therethrough extending along a longitudinal axis of the fitting in which the passage is located. Each fitting has a distal end spaced apart from the end piece wall at a predetermined distance. At least one lateral support extends laterally from the first fitting with the lateral support being spaced apart from the end piece wall. A projection extends from the lateral support along a longitudinal axis of the projection and in a direction away from the end piece wall.

In further variations, this lateral support extends a distance less than that needed to extend beyond the outer periphery of the filter cartridge. Advantageously, the longitudinal axis of the cartridge is substantially parallel to the longitudinal axis of the projection. Further, there are preferably two lateral supports, one extending from each of the fittings, with the supports joined together adjacent a distal end of the lateral supports and the projection extending from the joined lateral supports. Advantageously, each lateral support has a top edge and a bottom edge with the bottom edge inclined away from a plane orthogonal to the longitudinal axis of the cartridge and with the bottom inclined from that plane at an angle of about 10-25 degrees so that the bottom edge of each lateral support is further from the end piece wall adjacent the projection axis than adjacent the fitting from which the lateral support extends. Advantageously, the top edge of at least one and preferably both lateral supports is slightly inclined toward the bottom edge at an angle of about 1-5 degrees.

BRIEF DESCRIPTION OF THE DRAWINGS

These and other features and advantages of the invention will become more apparent in light of the following discussion and drawings, in which like numbers refer to like parts throughout, and in which:

FIG. 1 is a top perspective view of a back side of a nozzle-end of a filter cartridge of this invention;

FIG. 2 is a top perspective view of a front side of the nozzle-end of FIG. 1;

FIG. 3 is a left side plan view of the nozzle-end of FIG. 1;

FIG. 4 is a bottom perspective view of the front side of the nozzle-end of FIG. 1;

FIG. 5 is a front plan view of the nozzle end of FIG. 1;

FIG. 6 is a back plan view of the nozzle-end of FIG. 1;

FIG. 7 is a front perspective view of a filter cartridge with the nozzle-end of FIG. 1;

FIG. 8 is a back perspective view of the filter cartridge of FIG. 7;

FIG. 9 is a front plan view of the filter cartridge of FIG. 7;

FIG. 10 is a back plan view of the filter cartridge of FIG. 9;

FIG. 11 is a sectional view through fitting 25 with dimensions of a preferred embodiment;

FIG. 12a is a top plan view of the filter cartridge of FIG. 7 with dimensions of a preferred embodiment;

FIG. 12b is a top plan view of the filter cartridge as in FIG. 12a but without dimensions;

FIG. 15 is a side plan view of the nozzle-end of FIG. 1 with a slanted bottom on the lateral supports;

FIG. 16 is a top plan view of the nozzle-end of FIG. 15;

FIG. 17 is a top perspective view of the front of the nozzle-end of FIG. 15;

FIG. 18 is a sectional view taken through fitting 24; and

FIG. 19 is a top plan view of the nozzle-end of FIG. 1 but with a single lateral support extending from a nozzle.

DETAILED DESCRIPTION

Figure 14:
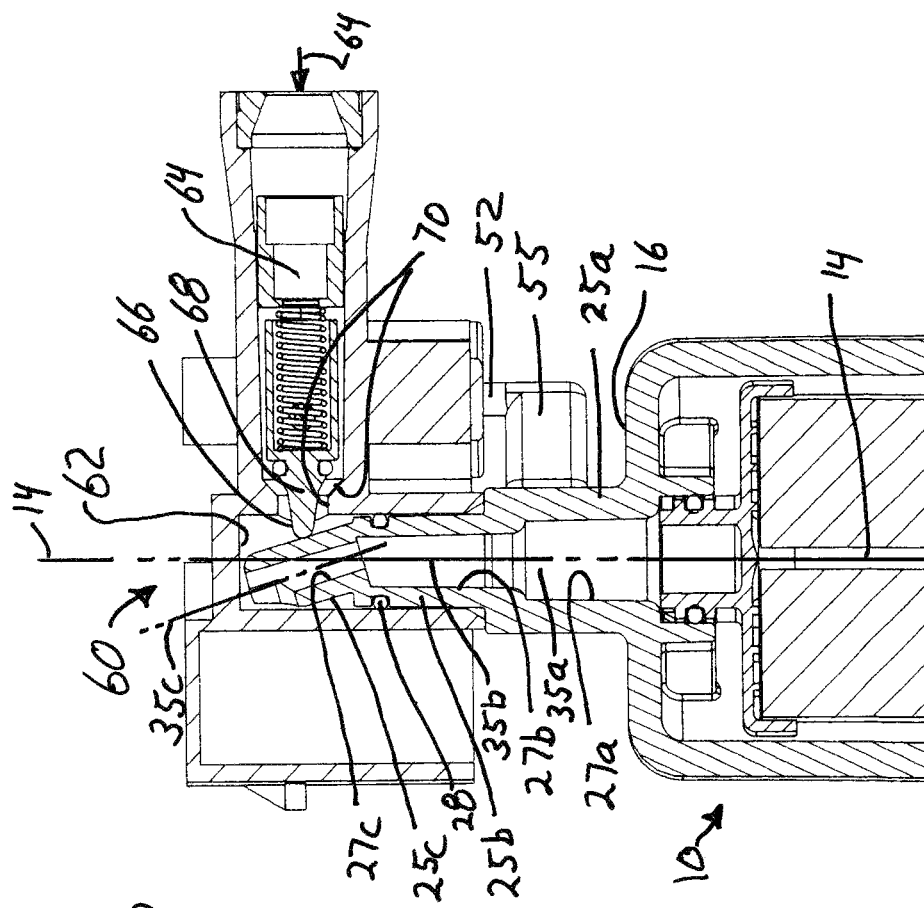
FIG. 14 is a cross-sectional view of a filter cartridge nozzle-end of FIG. 1 engaging a shut-off valve in a head assembly.

Referring to FIGS. 1-11, a water filter cartridge 10 has a cartridge sidewall 12 that is typically cylindrical and extends along a longitudinal 14 passing through the centerline of the cylinder. The sidewall 12 is closed by first and second ends 16, 18 so the sidewall and ends enclose a filter element 20. Internal passages 22 (FIG. 11) within the filter cartridge 10 direct unfiltered water through the filter element 20 and filtered water out of the filter element 20 through inlet and outlet fittings or nozzles that may take various shapes. In the depicted embodiment the inlet and outlet are separated rather than being coaxial.

First and second fittings extend from the first end 16 of cartridge 10 to form an inlet and outlet for water flowing through the filter cartridge 10. The fittings may have various configurations and in some cartridges a particular fitting may comprise the inlet while in other cartridges the identically located fitting may comprise the outlet. In the depicted embodiment the fittings have a multiple-stepped exterior diameter with an inclined nozzle on the distal end, but the fittings could be straight along the entire fitting length, and have fewer or more changes or steps in diameter.

In the depicted embodiment the fittings 24, 25 are shown as each having a first, tubular base 24a, 25a, and second, smaller diameter, intermediate tubular portion 24b, 25b, and a distal end 24c, 25c. The fittings portions preferably form a stepped fitting with a slight shoulder or ledge at the junction of larger diameter tubular base portion 24a and smaller diameter intermediate tubular portion 24b, and with a slight shoulder or ledge at the junction of the larger diameter intermediate tubular portion 24b and the smaller diameter distal end portion 24c. Likewise, there is preferably a slight shoulder or ledge at the junction of tubular base portion 25a and smaller diameter intermediate tubular portion 25b, and with a slight shoulder or ledge at the junction of the intermediate tubular portion 25b and the smaller diameter distal end portion 25c. The terms fitting and nozzle will be used interchangeably to refer to parts and sub-parts of nozzles 24, 25 and subparts of those nozzles.

The fittings 24, 25 each have an internal passage 26, 27, with passage 26 having segments 26a, 26b, 26c and passage 27 having segments 27a, 27b, 26c. Passage 26a extends through fitting portions 24a, passage 26b extends through fitting portion 24b, and passage 26c extends through fitting portion 24c. Likewise, internal passage 27a extends through fitting portion 25a, passage 27b extends through fitting portion 25b, and passage 27c extends through fitting portion 25c. Advantageously, a recess 28 (FIGS. 4-6) encircles each fitting and provides a recess within which a flexible seal 30 (FIGS. 1-3) may be placed. The recess 28 is shown adjacent the distal end of the intermediate tube 24b and 25b.

The tubes 24, 25 may be of various size and shape, with a continuous cross-section along their length or with a varying cross section as shown in the illustrated embodiment. In the depicted embodiment, the tubes 24a, 25a extend from the end wall of the first end 16 and have a longitudinal axis 34 has segments 34a, 34b, 34c extending through the center of each tube portion or segment 24a, 24b, 24c and axis 35 has segments 35a, 35b, 35c extending through tube portion or segment 25a, 25b, 25c. When viewed from the side the longitudinal axes of tubes 24, 25 may coincide with the longitudinal axis 14 in the preferred embodiment (FIGS. 3, 11, 18) and when viewed from the front or back (FIGS. 9, 10) the axes 34, 35 are on opposing sides of the cartridge's axis 14. The tubes 24 and inner passages 26, 27 are preferably cylindrical.

Preferably, the distal end portions 24c, 25c of the tubes take the form of inclined nozzles. Each nozzle portion 24c, 25c has an outer surface 40, 41 so first and second nozzles 24c, 25c have outer surfaces 40, 41, respectively. In the illustrated embodiment each outer surface 40, 41 is generally cylindrical but extends along an inclined axis 34c, 35c with the axis 34c, 35c and nozzle 24c, 25c both being slanted or inclined at an angle to the longitudinal axis 34a, 34b and 35a, 35b, as best seen in FIGS. 3, 11 and 18. The internal passages 26c, 27c of portions 24c, 25c are also inclined. An angle of inclination of about 2-30 degrees relative to an axis parallel to longitudinal axis 14 is believed suitable, with an inclination of about 14-20 degrees believed more preferable and an angle of about 16 degrees being preferred and shown in FIG. 11. The construction of the inclined distal end portions 24c, 25c alters with the angle of inclination of axis 42 as described below. These inclined nozzles on the distal end are optional, as the tubes 24, 25 could be straight along their entire length.

Referring to FIGS. 3, 11 and 18, the longitudinal axes 34a, 34b and 35a, 35b may be placed in the same first plane, with the longitudinal axis 34c, 35c of the distal end portion 24c, 25c being placed in a second plane inclined to the first plane at the above angles. When viewed from a direction rotated 90 degrees to that of FIGS. 5, 6, 9 and 10, the axes 34a, 34b and 35c are in the same plane as are axes 35a, 35b, 35c. Referring to FIGS. 11 and 18, the intersection of longitudinal axes 34b and 34c does not occur in the juncture of the intermediate and end portions 24b, 24c, but is offset slightly from that juncture away from the intermediate portion 24b. Likewise, the intersection of longitudinal axes 35b and 35c does not occur in the juncture of the intermediate and end portions 25b, 25c, but is offset slightly from that juncture away from the intermediate portion 25b. An offset of about 0.05-0.15 inches is believed suitable, with an offset of about 0.08 inches shown in FIG. 11. The interior juncture is complex as the internal passages 26b, 27b are cylindrical and extend along longitudinal axes 34b, 35b, respectively and have a distal end orthogonal to the respective longitudinal axes. The interior passages 26c, 27c are preferably conical, widening away from the intermediate portions 26b, 27b, with the conical passages centered along the respective longitudinal axes 34c, 35c and with the interior end of the conical passage intersecting the respective cylindrical passages 26b, 27b of intermediate parts 24b, 25b at an angle, as best seen in FIGS. 11, 14 and 18. During molding, a tapered plug may be inserted into the distal end portions 24c, 25c along inclined axes 34c, 35c to form the interior passages 26c, 27c and the end of that tapered plug abuts a plug inserted along axes 34a, 34b, 35a, 35b at an angle the same as or about the same as the angle of inclination of the distal nozzle ends 24c, 25c.

Referring to FIGS. 11, 14 and 18, in the depicted embodiment the internal passage 26a, 27a of the base tubes 24a, 25a are large in diameter than the intermediate tubes 24b, 25b, with the diameter of distal end portions 24c, 25c being smaller still. The interior passage 26a, 27a is larger than the interior passage 26b, 27b, which in turn is larger than the interior passage 26c, 27c. The relative dimensions and locations of a preferred embodiment are shown in FIGS. 11 and 12a. The dimensions may vary diameter, especially as the inclination angle of distal end portions 24c, 25c changes.

The distal end portions 24c, 25c each have a respective opening 38, 39 formed by the intersection of the inner passage 26c, 27c the tube with the wall forming the tube or nozzle. While each tube or nozzle 24c, 25c could have a distal end completely orthogonal to the nozzle axis 34c, 35c, the preferred nozzle has an end with a first portion 40, 41 orthogonal to the nozzle axis 34, 35 and a second portion 42, 43 formed by the intersection of an inclined and curved surface with the nozzle axis 34c, 35c. The first end portions 40, 41 are in a plane orthogonal to the nozzle axis 34c, 35c, respectively. The nozzle end portions 40, 41 arise because the nozzles 24c, 25c fit into cylindrical ports in the manifold during use which ports seal against the seal, such as an O-ring seal, placed in recess 28. The inclined nozzles are shaped to fit within these cylindrical boundaries and allow water to flow into and out of the openings 38, 39 of the nozzle 24c, 25c. The openings 38, 39 are generally in the same plane as seen in FIG. 3. As used herein the term "generally in the same plane" has the edges deviating by less than about 3 mm from the plane of the surface defining its portion of the opening 38, 39. The exact shape of the openings 38, 39 will change with the angle of inclination of axis 34, 35.

Thus, at least tubes 24b, 24c and 25b, 25c fit within a cylinder extending along outer cylindrical walls of tubes 24b and 25b and centered on tube axis 34b, 35b. As the slant angle of the nozzle axes 34, 35 increases the openings 38, 39 extend closer to the cylindrical tube in the manifold encircling tube 24b, 25b, the outer surface the nozzle 24c, 25c must be cut away to fit within that manifold tube. Thus, at a nozzle axis inclination angle of about 16° as shown in FIG. 11, the nozzle sidewall with outer surface 40 would extend beyond the manifold's cylindrical tube encircling tubes 24c, 25c and their axes 34c, 35c, with the result that the outer surface is cut away at an inclined angle to nozzle axis 34c, 35c to form inclined edges or inclined faces 42, 43 so the sidewall surfaces 40, 41 do not pass that cylindrical boundary of the manifold. The openings 38, 39 defined by edges 40, 41, 42, 43 are spaced from the cylindrical boundary to allow water to flow into or out of the portion of openings 38, 39 defined by those edges.

The distal end portions 40, 41 of the fitting or nozzle 24c, 25c are inclined and may abut a frozen surface in the manifold during use. The intersection of the edges 50 and 42, and the intersection of edges 41 and 43, provided more pointed edges that may also abut a frozen surface in the manifold during use. Those surfaces provide good ice breakers as they have a relatively small end portion and inclined support walls to provide strength and to provide an uneven contact with a frozen surface. That can help insertion and removal of the fittings 24, 25 from the manifold during use.

Lateral support 54 extends laterally from tube 24a while lateral support 55 extends laterally from tube 25a. As used herein, laterally means in a direction transverse to the respective longitudinal axes 34a, 34b of the nozzles, including radial directions. The lateral supports 54, 55 preferably extend radially from the tubes 24, 25 but need not do so and the joinder location with the tubes 24a, 25a will vary depending on the desired location of projection 52. The lateral supports 54, 55 are preferably molded integral with the tube 24, 25 from which the support extends so as to form a single piece of material that is simultaneously molded. But the support 54, 55 could be connected to the tube by any suitable means, including adhesives, friction bonding, heat bonding, or mechanical fasteners.

The lateral supports 54, 55 join each other at an angle forming an apex from which projection 52 extends. The juncture is preferably integrally molded as described above, but the juncture of the ends could be by any suitable means as described above. The cross-sectional shape of lateral supports 54, 55 is shown as generally rectangular (with rounded corners), but other shapes could be used. The lateral supports 54, 55 are configured and oriented to locate the projection 52 at a desired location and to support that projection with sufficient stiffness to achieve the desired function of the projection 52. The depicted lateral supports form a generally V-shaped structure located above and offset from the end-piece 16 of cartridge 10. The bottom surface of each lateral support 54, 55 may be generally rounded and orthogonal to the nozzle axes 34a, 35a as best seen in FIGS. 4-5, with rounded edges joining the flat, opposing and generally parallel sides of each lateral support. But the bottom and joining surfaces could be any shape and one variation is described later and shown in FIGS. 15-17.

The two opposing sides of the lateral supports 54, 55 are generally parallel and flat, but could be other shapes. As best seen in FIGS. 10 and 12a-12b, the interior juncture of lateral supports 54, 55 is preferably curved to reduce stress concentrations, but the radius of curvature may vary, and the interior juncture need not be curved but could be a flat. As seen in FIGS. 2, 6 and 12a-12b, the facing sides of the base tubes 24a, 25a may have a flat surface 56, 57 thereon in order to accommodate a slide used in molding to shape the inside of the juncture of the offset supports 54, 55 and the supports themselves. If the spacing between the fitting bases 24a, 25b is far enough, the slide is not needed and the fitting base may be cylindrical without any flats, or it may be another shape.

At least one, and preferably both base portions 24a, 25a have a height H measured from an exterior surface of the end piece wall 16 along the longitudinal axis 14 of the cartridge 10. The projection 52 preferably has a distal end that is located a distance greater than H from the exterior surface of the end piece wall measured along the longitudinal axis, with that distal end being between the end of the first base portion 24a, 25a and the intermediate section 24b, 25b. Thus, the projection 52 ends at a location shorted than the distance to the end of the intermediate portion 24b, 25b, as measured along the longitudinal axis 14. Further, at least one and preferably both lateral supports have a top surface located less than a distance H from the exterior surface of the end piece wall 16 as measured along the longitudinal axis 14.

The use of two lateral supports 54, 55 extending from the base of the fitting 24a, 25a provides a very stable support for the projection 52. The lateral supports 54, 55 also connect the two fittings 24, 25 and further stabilize and strengthening those fittings, thus providing increases resistance to splaying or other movement of the fittings 24, 25, increased strength and resistance to deflection or bending during shipping, handling and installation. Supporting the axial projection 52 from lateral supports 54, 55 that join each of the fittings 24, 25 thus advantageously provides a way of strengthening and stabilizing the elongated tubular fittings while providing a stable projection.

The lateral supports 54, 55 advantageously do not extend beyond the outer periphery of the end piece wall on the first end 16, but they could do so if desired. Likewise, the projection 52 is not located beyond the outer periphery of the end piece wall on the first end 16. The most typical location of the projection 52 places the periphery of the projection 52 about ¼ to about ½ of an inch from the outer surface of one of the adjacent tubes 24, 25.

Because the juncture of the first end 16 with the body 12 may be rounded or tapered, the outer periphery of the end piece wall or the first end refers to the juncture of the first end 16 with the body 12 of cartridge 10. Thus, an imaginary cylinder extending along the outer periphery of body 12 and its juncture with the first end 16 would preferably not be crossed by either lateral support 54, 55 and that makes it easier for shipping, but it could be crossed for some configurations. Likewise, the projection 52 would preferably not be located beyond that imaginary cylinder, but could be located outside that imaginary cylinder for some configurations. In the event that the end piece wall or the first end 16 has an end piece wall of noticeably smaller diameter than the body 12 and necking inward toward the longitudinal axis 14 to form a noticeably smaller end 16 than the body 12 which end 16 extends parallel to longitudinal axis 14, then the outer periphery of the first end or first end piece wall would preferably be that of the smaller end 16 rather than the larger body 12, but the lateral supports and projection could extend further outward for some configurations—although would preferably not do so.

Further, the ability to change the location and orientation of the lateral supports 54, 55 allows the projection to be positioned at a large variety of locations. Moreover, the lateral supports 54, 55 shorten the length of the projection significantly compared to the length needed if the projection were to extend from the end piece 16 of the cartridge 10, and provide a more stable support for the projection. The shorter length of the projection 52 allows use of a stiffer and stronger projection. Still further, the ability to offset the projection 52 away from the end piece 16 of the cartridge allows the projection to reach locations deeper into the mating manifold than previously available for a projection of the same length. That allows more flexibility in designing the manifold as actuated parts may be further from the end of the cartridge than previously required. Indeed, the prior art cartridges typically provided a flat surface on the otherwise curved end piece 16, and that flat surface was needed to allow the projection 52 to fully mate with the manifold during use. The ability to offset the projection from the end wall of the cartridge removes the need to mold the flat into the curved end-piece.

Figure 13:
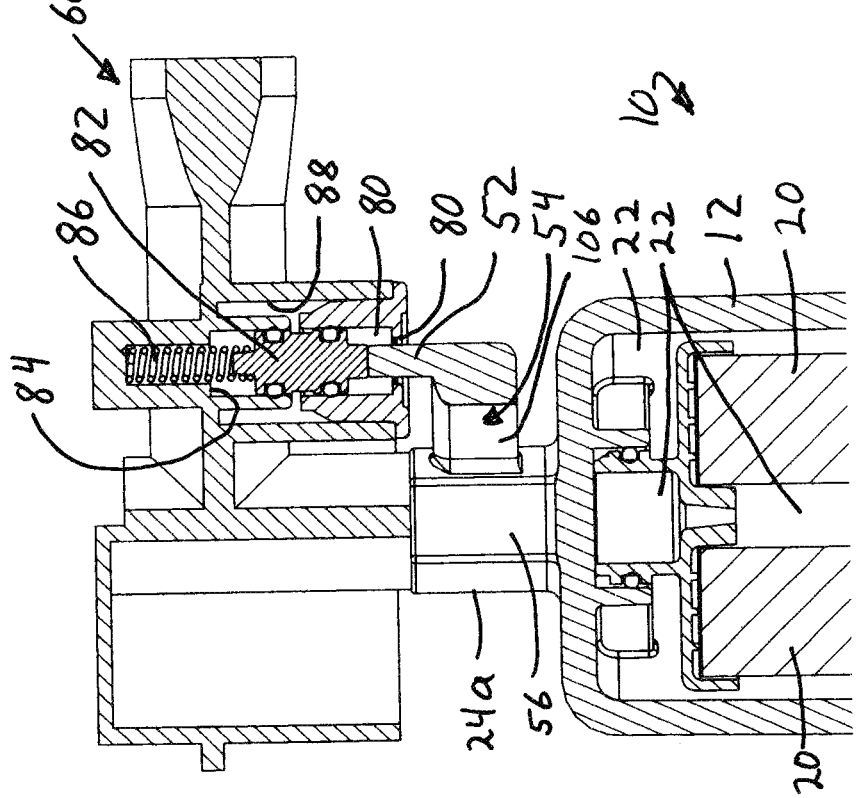
FIG. 13 is a cross sectional view of a filter cartridge nozzle-end of FIG. 1 engaging a bypass valve in a head assembly.

Referring to FIG. 13-14, a manifold 60 is described that is configured to mate with the depicted fittings 24, 25 and especially mate with fitting portions 24b, 24c, 25b and 25c. Such manifolds are known in the art and described in more detail in U.S. Pat. No. 6,610,932, the complete contents of which are incorporated herein by reference. FIGS. 9-16 of U.S. Pat. No. 6,610,932 and corresponding text are especially of interest for the manifold and cartridge interaction. Returning to FIGS. 13-14 the manifold 60 has first and second tubular ports 62, only one of which is shown. The manifold ports 62 are each sized to receive one of the cylindrical tubes 24b, 25b, respectively and provide a water tight seal with seals 30 which are typically O-ring seals. The ports 62 preferably have a longitudinal axis coincident with the longitudinal axis 34b, 35b of the tubes 24b, 25b. In the embodiment of U.S. Pat. No. 6,610,932 the first port is an outlet port and the second port is an inlet port and that terminology is used here, but one skilled in the art will recognize the ports can be reversed by altering the inner flow passages 20 of filter cartridge 10.

Extending laterally (i.e., in an orthogonal plane) from the axis of the ports 62a, 62b are water passages 64, and specifically water outlet and water inlet passages, only one of which is shown in the cross-section of manifold 60. Each passage 64 has a valve seat 66 with a valve body 68 resiliently urged against the valve seat. A cam follower 66 is connected to each valve body and extends into one of the ports 62 a distance to abut at least the outer surface of inclined nozzle portions 24c, 25c on the filter cartridge.

Thus, each port 62 has a cam follower 66 extending into the outlet port 62 on a valve body 68 so port 62 can be selectively placed in fluid communication with the water passage 64 during use. One port is for inlet of unfiltered water and the other port is for outflow of filtered water. When the ports 62 are empty the valve body 68 is resiliently urged against valve seat 70 to stop water from flowing into or out of the port 62. When nozzles 24, 25 are each inserted into a different one of ports 62 the seals 30 on the fitting tubes 24b, 25b seal against the inside wall of the mating port 62 to block flow out of the respective port 62 while the distal, slanted fitting ends or slanted nozzles 24c, 25c each abut a different cam follower 66 to begin opening one of the valve bodies 68 and allow water to flow into and out of the filter. The inclined outer surfaces of fitting ends 24c, 25c are located relative to cam followers 66 and seals 30 on tubes 24b, 25b so that the ports 62 are blocked before the cam follower unseats valve body 68 from valve seat 66 to allow water to flow through the ports 62. When the fitting ends 24c, 25c are removed the sequence reverses so that the valves shut off the flow before the seals 28 disengage the walls of ports 62 to restrict leakage out the ports 62.

Referring to FIG. 13, the manifold has a bypass valve body 82 which may be actuated through opening 80 in the manifold 60. The construction of the bypass valve is known as is the location of the projection 52 to actuate that bypass valve and allow water to flow to the respective passages 64 and ports 62 when the distal ends 24c, 25c 46 are sufficiently inserted into ports 62. One illustrative bypass valve body 82 is shown, sealed against the internal walls of water passage 84 with a pair of O-ring seals. The illustrated valve body 82 is resiliently urged to a closed position, preferably by spring 86. When in a first, closed position water flow in the manifold 60 is directed by the bypass valve body 82 to flow around the port 62 forming the inlet port, and when in a second, open position water flow in the manifold 60 is directed to flow to the manifold's inlet passage 64 and the port 62 forming the inlet port. The bypass valve body 82 thus allows water to bypass the manifold's inlet passage 64 and the inlet port 62 and guard against inadvertent flow through the inlet port if the filter and nozzles are not properly in position in the inlet port 62. FIG. 13 shows the bypass valve body 82 in the second, open position which allows water to flow into the bypass passage 88 to the inlet port, with the detailed flow passage through manifold 60 not being shown but being known in the art.

In order to actuate the bypass valve body 82 the projection 52 must be aligned with the opening 80 and enter the opening a distance sufficient to actuate the bypass valve body 82. The opening 80 is typically determined by the manufacturer of the appliance with which the filter cartridge 10 is used. The opening 80 may be a circular hole, requiring the projection 52 to be accurately positioned and to extend a distance sufficient to actuate the valve body 82. The ability to vary the length and position of each lateral support 54, 55 allows great flexibility in positioning the projection 52 relative to one or both fittings 24, 25. The ability to have two lateral supports 54, 55 provides a very stable base from which the projection 52 may extend, allowing a short projection to be accurately positioned at the desired location of opening 80 in the manifold 60. The use of the lateral supports 54, 55 allows a shorter length on the projection 52 than available in the past. The combination of the lateral supports 54, 55 and projection 52 is believed to be much more stable and sturdy, and less subject to positioning errors and damage than prior art devices.

As seen in FIGS. 3, 8 and 11, the inclined nozzles 24c, 25c are inclined away from the longitudinal projection axis 51 of projection 52 and preferably inclined in a plane that is not parallel to the plane containing the longitudinal axis 14 of the filter cartridge and the longitudinal axis of the protrusion 52. The longitudinal axes 34c, 35c of the nozzles 24c, 25c may lie in the same plant which is inclined to a plane orthogonal to the longitudinal axis 14 of the filer cartridge and orthogonal to the longitudinal axis 34b, 35b of the tubes 24b, 25b. In the depicted embodiment of FIGS. 3, 8 and 11, the longitudinal axes 34b, 35b the nozzles 24c, 25c may also be contained in two separate but parallel planes, with one plane containing the axes 34b, 34c and slanted tube 24c, and the other plane containing axes 35b, 35c and slanted tube 25c. Those planes are best illustrated in FIGS. 3 and 11.

The inclined nozzle axes 34c, 35c are inclined away from the longitudinal axis of the projection 52 so that the axes 34c, 35c at the distal end 40, 41 of the nozzles 24c, 25c are further away from the longitudinal axis 51 of the projection 52 than are the axes 34c, 35c at the juncture of the intermediate and end portions 24b, 24c and 25b, 25c. For example, the longitudinal axis 34c of the fitting portion 24c is inclined in a direction away from the longitudinal axis 51 of projection 52 such that the shortest distance between the longitudinal axis of the projection 52 and the longitudinal axis 34c of the nozzle portion 24c at a distal end 40, is greater than the shortest distance between the longitudinal axis of the projection and the longitudinal axis 34c of the nozzle portion 24c adjacent the juncture with the longitudinal axis 34b of the inlet tube 24b when the axes 34c and 34b are in the same plane, or adjacent the closest approach of those two axes when they are not in the same plane.

The slanted distal ends 24c, 25c provide advantages in the undesirable event that the water freezes in the ports 62. The nozzle passages 26c, 27c are conical and tapered outward so the passages widen toward the distal opening 38, 29 of each inclined nozzle 24c, and 25c. As the water freezes the expanding ice will push against the conical passage 26c, 27c and force the freezing ice outward along nozzle axes 34c, 35c. A taper at an angle of between about 1 and about 10° from the axis 26c, 27c is believed suitable, with a taper of about 1-5° from that axis believed preferable. That taper is believed to make it easier to disengage the ice in the nozzle passages 26c, 27c from the nozzle and from the port 62. Likewise, as best seen in FIG. 14, the distal fitting ends 24c, 25c slant away from the centerline of the manifold passages 64 and slant toward the corner of the port 62 opposite the manifold passage 64. The result is that a major portion of the outer surface of the slanted ends 24c, 25c is slanted toward one corner of the port 62 so that when the water freezes in the port the resulting expansion of the ice forces each of the slanted ends 24c, 25c out of the port 62, making removal of the nozzle and cartridge 10 easier.

Also, because the distal openings 38, 39 of the distal, slanted ends 24c, 25c are slanted or inclined relative to the longitudinal axis of the port 62 it is believed the inclination urges fracture of the ice along the nozzle opening 38, 39, and that is believed to make it easier to remove the slanged ends 24c, 25c from the port. This is especially so because the cross-sectional area of the passages 38c, 39c along axes 34c, 35c is much smaller than the cross-sectional diameter of the prior art inlet and outlet of the tubular passage which effectively have the first and second tubes 24, 25 being extended further into the ports 62 so as to form a much larger cross-sectional area. The smaller cross-sectional area or diameter makes it easier to break the ice frozen inside the passage. While the cross-sectional diameter of the nozzle flow passages 38c, 39c is smaller than the prior art, it is believed more than capable of meeting the flow requirements which are usually low. It is also believed that the irregular surface of the slanted distal ends 24c, 25c when viewed along the axis of the port 62 (FIG. 14) makes it easier to disengage the nozzle from the ice formed in the port 62, in part by creating multiple fracture planes at different orientations to the axis and at different locations along that axis.

Further, when the fittings 24, 25 are is removed from a frozen port 62 the ice may be more easily removed from the nozzle passages 38c, 29c because of the conical taper of that passage which decreases in size toward the beginning of the nozzle to form a generally conical plug of ice if the nozzle is full of ice. Also, the narrow neck of the conical passages 38c, 39c where it joins the cylindrical passage 38b, 39b of the intermediate tube 24b, 25b is believed to form a fracture location making it easier to break the ice if it is frozen to that portion of the filter cartridge. The change in diameter from the juncture of passages 38a to 38b, and 39a to 39b provides further fracture locations.

The end 16 of the filter cartridge 10 may be formed as a single piece filter cap and fastened to the sidewall 12 of the cartridge 10. Thus, the tubes 24, 25, and the lateral supports 54, 55 and projection 52, may be molded as a single piece of material. Spin welding, ultrasonic welding, adhesives and other fastening methods and mechanisms may be used to attach such a single piece filter cap to the body 12 of the cartridge 10. Optionally, the filter cartridge sidewall 12 may be molded as a single piece with and at the same time as the tubes 24, 25, and lateral supports 54, 55 and projection 52 are molded. Any suitable material that is compatible with use as a water filter may be used, with plastics being preferred for their ease of injection molding, including polyethylene, polypropylene and ABS.

When the preferred filter cartridge is configured for use with the manifold 60 of U.S. Pat. Nos. 7,147,773 or 7,000,894, the projection 52 is positioned between the longitudinal axes 34 of the first and second tubes, with the distance from the longitudinal axis 34b of the second tube 24b to the longitudinal axis of the first tube 24a is less than the distance from the longitudinal axis 24b of the second tube 34b to the longitudinal axis of the projection 52. Further, the distance from the longitudinal axis of the second tube 34b to the longitudinal axis of the projection 52 is greater than the distance from the longitudinal axis 34a the first tube 24a to the longitudinal axis of the projection. Moreover, the distance from the longitudinal axis 34b said the second tube 24b to the longitudinal axis 34a the first tube 24a is about 2 cm, and the distance from the longitudinal axis 34b of the second tube 24b to the longitudinal axis of the projection is about 2 cm, and the distance from the longitudinal axis 34a of the second tube 24a to the longitudinal axis of the projection is about 2 cm.

Referring to FIGS. 11 and 12a, scaled drawings show several distances (in inches) of a preferred embodiment of the above descried fittings 24, 25 and projection 52. The first and second tubes 24, 25 have bases 24a, 25a extending from the end wall 16, with distal ends 24c, and 25c. The fittings 24, 25 and projection 52 may be located to perform the same functions as the fittings and projection in U.S. Pat. No. 7,000,894 and to cooperate with the manifold described in that patent. The complete contents of U.S. Pat. No. 7,000,894 are incorporated herein by reference. Since fitting 24 may be the inlet or outlet while fitting 25 is the other of the inlet or outlet, some preferred dimensions for compatibility with the embodiment of this patent will be described with fitting 24 as the inlet and 25 as the outlet, recognizing that the parts could be reversed. In particular, the projection 52 may be positioned between the base 24a of the inlet fitting 24 and the base 25a of the outlet fitting, each base having a longitudinal axis 34a, 35a, respectively. The distance from the longitudinal axis 34a of the base 25a of the inlet fitting to the longitudinal axis 35a of the base 35a of the outlet fitting is less than the distance from the longitudinal axis 34a of the base 24a of the inlet fitting to the longitudinal axis 51 of the projection 52. The distance from the longitudinal axis 34a of the base 24a of the inlet fitting 24 to the longitudinal axis 51 of the projection 52 is greater than the distance from the longitudinal axis 35a of the base 25a of the outlet fitting 25 to the longitudinal axis 51 of the projection 52. The distance from the longitudinal axis 34a of the base 24a of the inlet fitting 24 to the longitudinal axis 35a of the base 25a of the outlet fitting 25 is about 2 cm. The distance from the longitudinal axis 34a of the base 24a of the inlet fitting 24 to the longitudinal axis 51 of the projection 52 is about 2 cm. The distance from the longitudinal axis 34a of the base 25a of the outlet fitting 25 to the longitudinal axis 51 of the projection 52 is about 2 cm.

Referring to FIGS. 7-10, the filter cartridges 10 may have first and second mounting connectors 90, 92, respectively on the second end of the filter body 12, adjacent the second end cap 18. The first mounting connectors 90 are preferably as described in more detail in U.S. Pat. Nos. 7,147,773 and 7,000,894, the complete contents of which are incorporated herein by reference. The mounting connector 90 preferably comprises a latch capable of being releasably engaged by an appliance. Mounting connectors 92 comprise two parallel guide rails on an opposing side of the filter housing 12 as the latch 90. The guide rails run along the cartridge housing parallel to longitudinal axis 14 for about one quarter the length of the cartridge. The rails 92 guide the cartridge 10 so the latch 90 engages a corresponding mechanism in the manifold 60 to releasably connect the cartridge to the manifold. The mounting connectors 90, 92 are known in the art and not described in more detail herein.

Referring to FIGS. 15 and 17, each of the two lateral supports 54, 55 are shown with a bottom edge 104, 105, respectively, that is inclined away from the end first end 16 of the cartridge 12 as the supports approach projection 52. An angle of about 10-25° away from the plane orthogonal to axes 26a, 27a is believed suitable, with an angle of about 20° degrees preferred. Thus, the bottom edge of each lateral support 54, 55 is inclined away from the end piece wall 16 as the lateral support extends away from the base of the fitting 24a, 25a from which the lateral support extends. The angle is preferably measured in a plane orthogonal to the longitudinal axis 14 at the location where that orthogonal plane intersects the bottom of the lateral support as it joins the fitting from which the lateral support extends. The top of the lateral support is advantageously parallel to that orthogonal plane. Because of the inclined bottom, each lateral support 54, 55 preferably has a generally trapezoidal shape when viewed normal to the surface of the side. The inclined surface helps molding as a slide may be inserted laterally to mold the bottom edges 104, 105.

Referring to FIG. 12a, a molding slide fits between the bases 24c and 25c to form the inner surfaces 106, 107 of the lateral supports 56, 57, respectively. The slide may have parallel sides to form the flats 56, 57 and have inclined converging sides joining at a rounded point to form flats 106, 107. The rounded point forms the curved juncture at the inside of the distal ends of lateral supports 54, 55. The inside surfaces of lateral supports 54, 55 are generally parallel to the outer surface of the lateral supports, resulting in a uniform cross-section along the length of each lateral support—except for the juncture with the base 24a, 25a from which the lateral support extends, and except for the juncture of the distal ends of the lateral support at projection 52. The cross section is generally rectangular, with rounded corners.

Referring to FIGS. 15-17, lateral supports 54, 55 may also be have a non-symmetric cross-section taken along a centerline extending from the nozzle portion 24a, 25a to the distal end at which the protrusion 52 is located. When viewed from the top along the cartridge axis, the lateral supports 54, 55 with the slanted bottom edges 104, 105 have a juncture with their respective nozzles 24a, 25a that is larger in vertical-cross-section than at the juncture with protrusion 52. This may result from a molding slide which is inserted between the facing portions of the two nozzle bases 24a, 25a to form flat surfaces 57, 58 with the molding slide continuing to extend those flats onto at least a portion of the inside surface of support arms 54, 55. Since in the depicted embodiment the projection 52 is not centered between flats surfaces 57, 58, the molding slide has two opposing sides of unequal length with a curved end forming the interior curved surface on the inside of the apex at which supports 54, 55 join. In the depicted embodiment one curved end of the slide is advantageously tangential to one side so as to form a substantially continuous, flat surface 57 on nozzle 25a, that extends into the lateral support 55 to form a flat, inner, side surface 57 on the support 55. In the embodiment of FIGS. 15-16, the lateral supports 54, 55 position the projection 52 in the same position but at least one lateral support 54, 55 has a non-uniform cross-section along its length. Referring especially to FIG. 16, the flats 56, 57 extend past the nozzle bases 24a, 25a and into the inner part of the lateral supports 56, 57 to form at least one and preferably two lateral supports having parallel sides adjacent at least the bases 24a, 25a from which the lateral support extends. In the depicted embodiment lateral supports 55, 57 each have a thicker cross-section adjacent the juncture with the base portion 24a, 25a, with lateral support 57 having an inner wall 106 parallel to its outer wall and joining the flat 56 along the length of the lateral support 54. Lateral support 55 has its entire length in substantially the same plane as the flat 57. The molding slide thus has a curved point forming the inner apex surface of the juncture of supports 54, 55, with the curved point being tangential to and forming flat inner side 106 of lateral support 54, and with the curved point joining slanted inner side 106. Side 106 is generally parallel to the outer, opposing side of lateral offset 54, while lateral support 54 forms a wider base juncture at nozzle base 24a. The molding slide forming flats 56, 57, 106 and the rounded inner surface of the juncture of the lateral supports 54, 55, may be inserted laterally in a plane orthogonal to axis 51 and between the nozzle bases 24a, 25a, or it could be inserted axially parallel to axis 51, or both.

The above description is given by way of example, and not limitation. Given the above disclosure, one skilled in the art could devise variations that are within the scope and spirit of the invention disclosed herein, including various angles of inclination of the distal ends 24c, 25c and various external shapes of those distal ends. Likewise, there are various locations available for the projection 52 and the resulting shapes of the one or two lateral offsets used to position the projection and stabilize it. Moreover, while two lateral supports 54, 55 are shown, a single lateral support may be used, with single lateral support 54 being shown in FIG. 19. That lateral support may have a parallel top and bottom as in FIG. 5, or it may have an inclined bottom as in FIG. 17. The particular configuration of the lateral support may vary. Likewise, while FIG. 19 shows the single lateral support as support 54 extending from base 24c, one skilled in the art will understand that the lateral support could extend laterally from base 25a. Further, while FIG. 19 shows the lateral support positioning the projection 52 in the same location as depicted in the other Figures, the projection 52 may be positioned as needed to mate with the manifold 60, which may vary, with the length and orientation of the lateral support being varied to achieve the desired position and stability of projection 52. Further, the various features of the embodiments disclosed herein can be used alone, or in varying combinations with each other and are not intended to be limited to the specific combination described herein.

What is claimed is:

1. A water filer cartridge having a first end, a closed second end, and a cartridge longitudinal axis extending through the ends, the cartridge having a filter media contained within the housing between the first and second ends, the cartridge comprising:
   an end piece wall on the first end of the cartridge, the end piece wall having an outer periphery, the end piece wall comprising:
   an inlet tube extending from the end piece wall, the inlet tube having a distal end spaced apart from the end piece wall, the inlet tube enclosing an inlet flow passage in fluid communication with an inlet of the filter media;
   an outlet tube extending from the end piece wall and not coaxial with the inlet tube, the outlet tube having a distal end spaced apart from the end piece wall, the outlet tube enclosing an outlet flow passage in fluid communication with an outlet of the filter media;
   two lateral supports each extending laterally from a different one of the inlet and outlet tubes, each lateral support being spaced apart from the end piece wall in a direction parallel to the cartridge longitudinal axis; and
   a projection extending from at least one of the lateral supports along a longitudinal projection axis and in a direction away from the end piece wall, the two lateral supports joining each other and extending a distance less than that needed to extend beyond an outer periphery of the filter cartridge so the projection extends from a location within that outer periphery and the projection is spaced apart laterally from the inlet and outlet tubes.

2. The water filter cartridge of claim 1, wherein the two lateral supports join each other to form a V-shaped support.

3. The water filter cartridge of claim 2, wherein the projection extends from an apex of the V-shaped projection.

4. The water filter cartridge of claim 1, wherein the inlet tube comprises a stepped inlet tube with at least one reduced diameter portion and having a base portion having a base inlet longitudinal axis and wherein the outlet tube comprises a stepped outlet tube with at least one reduced diameter portion and having a base outlet portion with a base outlet longitudinal axis.

5. The water filter cartridge of claim 1, wherein at least one of the inlet and outlet tubes has a distal end portion having a distal longitudinal axis that is inclined in a direction away from the longitudinal axis of a base portion of that tube.

6. The water filter cartridge of claim 1, wherein each of the inlet and outlet tubes has a distal end portion having a distal longitudinal axis that is inclined in a direction away from the longitudinal axis of the base portion of that tube, and wherein the fluid passageway extending along that inclined longitudinal axis is conical in shape and increasing in diameter in a direction away from the tube with the inclined axis.

7. The water filter cartridge of claim 1, wherein a longitudinal axis of a base portion of each of the inlet and outlet tubes is substantially parallel to the cartridge longitudinal axis, as is the longitudinal axis of the projection.

8. The water filter cartridge of claim 7, wherein the projection is positioned between a base of the inlet tube and a base of the outlet tube when viewed from a side of the tubes opposite the projection, each base having a longitudinal axis, wherein the distance from the longitudinal axis of the base of the inlet tube to the longitudinal axis of the base of the outlet tube is less than the distance from the longitudinal axis of the base of the inlet tube to the longitudinal axis of the projection, and wherein the distance from the longitudinal axis of the base of the inlet tube to the longitudinal axis of the projection is greater than the distance from the longitudinal axis of the base of the outlet tube to the longitudinal axis of the projection, wherein the distance from the longitudinal axis of the base of the inlet tube to the longitudinal axis of the base of the outlet tube is about 2 cm.

9. The water filter cartridge of claim 1, wherein each of the inlet and outlet nozzles has a base portion extending along an axis generally parallel to the cartridge longitudinal axis, and wherein at least one of the base portions has a circular outer periphery with a flat portion on a side of the at least one base portion which flat portion is facing the other base portion.

10. The water filter cartridge of claim 9, wherein the projection is positioned between a base of the inlet tube and a base of the outlet tube when viewed from a side of the tubes opposite the projection.

11. The water filter cartridge of claim 10, wherein at least one of the base portions has a height H measured from an exterior surface of the end piece wall parallel to the cartridge longitudinal axis, and wherein the projection has a distal end located a distance greater than H from the exterior surface of the end piece wall measured parallel to the cartridge longitudinal axis, and wherein each lateral support has a top surface located less than a distance H from the exterior surface of the end piece wall measured parallel to the cartridge longitudinal axis.

12. The water filter cartridge of claim 1, wherein each tube comprises a base portion extending from the end piece wall, an intermediate portion and a distal end portion with a first, inwardly extending shoulder between the base portion and the intermediate portion and with a second, inwardly extending shoulder between the intermediate portion and the distal end portion, the projection having a distal end located between the first and second shoulders.

13. The water filter cartridge of claim 1,
wherein the inlet tube extends from the end piece wall parallel to an inlet tube longitudinal axis, with the inlet tube having a distal end extending along an axis inclined at an angle of 1-30° from that inlet tube longitudinal axis, and wherein the outlet tube extends from the end piece wall along an outlet tube longitudinal axis, with the outlet tube having a distal end extending along an axis inclined at an angle of 1-30° from that outlet tube longitudinal axis.

14. The water filter cartridge of claim 1, wherein the at least one lateral support has a bottom edge that is inclined away from a plane orthogonal to the cartridge longitudinal axis at an angle of about 10-25 degrees so that the bottom edge of the lateral support is further from the end piece wall adjacent the longitudinal projection axis than adjacent the tube from which the at least one lateral support extends.

15. A water filer cartridge having a first end, a closed second end, and a longitudinal axis extending through the ends, the cartridge having a filter media contained within the housing between the first and second ends, the cartridge having an end piece wall with a first and second fitting extending therefrom to form an inlet and outlet for the filter cartridge, the cartridge comprising:
a lateral support extending laterally from each of the fittings, each lateral support being spaced apart from the end piece wall in a direction parallel to the longitudinal axis of the cartridge; and
a projection extending from at least one of the lateral supports along a longitudinal axis of the projection and in a direction away from the end piece wall so the projection is supported vertically above the end piece wall and laterally offset from both fittings, the projection being spaced apart laterally from both fittings.

16. The water filter cartridge of claim 15, wherein each lateral support extends a distance less than that needed to extend beyond an outer periphery of the filter cartridge, the lateral supports joining together to form a V shape when viewed parallel to the longitudinal axis of the projection.

17. The water filter cartridge of claim 15, wherein each lateral support has a bottom edge and a top edge, with the bottom edge inclined away from a plane orthogonal to the longitudinal axis of the cartridge at an angle of about 10-25 degrees so that the bottom edge of each lateral support is further from the end piece wall adjacent the projection than adjacent the fitting from which the lateral support extends.

18. The water filter cartridge of claim 17, wherein the top edge is inclined toward the bottom edge.

19. A water filer cartridge having a first end, a closed second end, and a longitudinal axis extending through the ends, the cartridge having a filter media contained within the housing between the first and second ends, the cartridge comprising:
an end piece wall on the first end of the cartridge, the end piece wall having an outer periphery;
a first fitting extending from the end piece wall along the cartridge longitudinal axis and having a first distal end spaced apart from the end piece wall a first predetermined distance, the first fitting enclosing a first flow passage in fluid communication with the filter media;
a second fitting extending from the end piece wall along a second longitudinal axis having a second distal end spaced apart from the end piece wall a second predetermined distance so the second fitting is not coaxial with the first fitting, the second fitting enclosing a second flow passage in fluid communication with the filter media;
two lateral supports, one extending laterally from each of the fittings, with the lateral supports joined together adjacent a distal end of the lateral supports, each lateral support being spaced apart from the end piece wall in a direction parallel to the cartridge longitudinal axis and spaced apart laterally from each fitting; and
a projection extending from the lateral supports along a longitudinal axis of the projection and in a direction away from the end piece wall.

20. The water filter cartridge of claim 19, wherein the lateral supports extend a distance laterally less than that needed to extend beyond the outer periphery of the filter cartridge.

21. The water filter cartridge of claim 19, wherein the longitudinal axis of the cartridge is substantially parallel to the longitudinal axis of the projection.

22. The water filter cartridge of claim 19, wherein each lateral support has a bottom edge that edge is inclined away from a plane orthogonal to the longitudinal axis of the cartridge and inclined from that plane at an angle of about 10-25 degrees so that the bottom edge of each lateral support is further from the end piece wall adjacent the projection axis than adjacent the fitting from which the lateral support extends.

* * * * *